United States Patent [19]
Frohmüller et al.

[11] Patent Number: 5,790,812
[45] Date of Patent: Aug. 4, 1998

[54] METHOD OF ENCODING OR DECODING PROTOCOL DATA UNITS (PDUS)

[75] Inventors: Peter Frohmüller, Fredersdorf; Mario Klaue, Berlin, both of Germany

[73] Assignee: Alcatel N.V., Rijswijk, Netherlands

[21] Appl. No.: 713,853

[22] Filed: Sep. 13, 1996

[30] Foreign Application Priority Data

Sep. 15, 1995 [DE] Germany .................. 195 34 207.0

[51] Int. Cl.$^6$ ........................................ G06F 13/42
[52] U.S. Cl. .................. 395/285; 395/200.3; 395/680; 395/821
[58] Field of Search ............... 395/200.01, 680, 395/285, 200.3, 821

[56] References Cited

U.S. PATENT DOCUMENTS

| | | | |
|---|---|---|---|
| 5,007,080 | 4/1991 | MacMillan et al. | 379/269 |
| 5,263,137 | 11/1993 | Anezaki | 395/200 |
| 5,418,963 | 5/1995 | Anezaki et al. | 395/700 |
| 5,418,972 | 5/1995 | Takeuchi et al. | 395/800 |

FOREIGN PATENT DOCUMENTS

| | | |
|---|---|---|
| 4217064 | 6/1993 | Germany . |
| 4210137 | 9/1993 | Germany . |

OTHER PUBLICATIONS

"Abstraction Techniques in Modern Programming Languages", M. Shaw, *IEEE Software*, Oct. 1984, pp. 10–26.
"Standardizing Hypermedia Information Objects", F. Kretz et al, *IEEE Communications Magazine*, May 1992, pp. 60–70.

*Primary Examiner*—Robert B. Harrell
*Assistant Examiner*—Saleh Najjar
*Attorney, Agent, or Firm*—Ware, Fressola, Van Der Sluys & Adolphson LLP

[57] ABSTRACT

In an open system (TN) in which the encoding and decoding of data is performed to transmit these data between system elements (VSTA, VSTX), it is proposed to enter definitions of different data types, which these data may have, into a definition dictionary. Generic functions are applied to abstract data types in a program for carrying out the encoding and decoding. When the program is running, the user-specific data are entered and their data type is determined. The definition of this data type is obtained from the definition dictionary and assigned to the abstract data types, so that the functions of the program are performed with the user-specific data. An implementation example of the method according to the invention is shown.

9 Claims, 4 Drawing Sheets

```
1 DTD_pObject obj;
2 DTD_pObject ber;

3 DTD_pDefinitions dtd = DTD_deserialize (0, 0);
4 DTD_pWs ws = DTD_new_workspace (dtd);

5       obj = DTD_parse (ws);
6       ber = DTD_encode (obj, ws);

7       DTD_dump (DTD_decode ("AttributeList", ber, ws));

8       DTD_deserialize (dtd, "my_def.per");

9       DTD_dump (DTD_decode ("AttributeList", ber, ws));

10 DTD_free_workspace (ws);
11 DTD_free_dtd (dtd);

-- input for line 5:
50 AttributeList {
        {
                attributeId {2 9 3 2 7 68},
                attributeValue StartTime "199507041200034.0"
        },
55      {
                attributeId {2 9 3 2 7 53},
                attributeValue ConfirmedMode TRUE
        },
        {
60              attributeId {2 9 3 2 7 999},
                attributeValue Packages {
                        {2 9 3 2 4 10},
                        {2 9 3 2 4 29},
                        {2 9 3 2 4 22}
65              }
        }
   }
```

Fig. 3a to Fig. 3b

```
                                      to Fig.3a
                        _____
                       /                                   \
        -- output for line 7:
     70 AttributeList {
                {
                        attributeId {2 9 3 2 7 68},
                        attributeValue StartTime "19950704120034.0"
                },
     75         {
                        attributeId {2 9 3 2 7 53},
                        attributeValue ConfirmedMode TRUE
                },
                {
     80                 attributeId {2 9 3 2 7 999},
                        attributeValue BER-String "1/x15/x06/x05Y/
                                                   x03/x02/x04/x0A/x06/x05Y/x03"
                }
        }

-- output for line 9:
     90 AttributeList {
                {
                        attributeId {2 9 3 2 7 68},
                        attributeValue StartTime "19950704120034.0"
                },
     95         {
                        attributeId {2 9 3 2 7 53},
                        attributeValue ConfirmedMode TRUE
                },
                {
    100                 attributeId {2 9 3 2 7 999},
                        attributeValue Packages {
                                {2 9 3 2 4 10},
                                {2 9 3 2 4 29},
                                {2 9 3 2 4 22}
    105                 }
                }
        }
```

Fig.3b

METHOD OF ENCODING OR DECODING PROTOCOL DATA UNITS (PDUS)

TECHNICAL FIELD

The present invention concerns a method of encoding and decoding protocol data units in an open system.

BACKGROUND OF THE INVENTION

Such an open system comprises a number of system elements, between which communication for controlling applications within the open system takes place. Said communication takes place via protocols. The information that is transmitted with this communication between the system elements is transmitted in the form of protocol data units. To that end user-specific data must be encoded in the system elements for the transmission, and transmitted and encoded protocol data units received by the system elements must be decoded for further processing by the system elements. A transmission language is used to transmit the protocol data units. Such a transmission language is BER (Basic Encoding Rules), known from the CCITT recommendation X.209. The CCITT recommendations X.720 and X.721 describe a model in principle of such an open system. The user-specific data are assigned to an object of the open system and can be of different data types. The data types are defined by their structure and their properties. Such definitions for the different data types are set forth in abstract description languages. Such abstract description languages are Guidelines for Definition of Managed Objects (GDMO), known from the CCITT recommendation X.724, and Abstract Syntax Notation 1 (ASN.1) known from the CCITT recommendation X.208.

A program is produced to perform the encoding and decoding, for the implementation of which the data type used for the user-specific data, which are processed by the program, must be known. If the data type changes, the program must be recompiled for this data type.

DISCLOSURE OF INVENTION

It is the task of the present invention to present a method whereby the encoding and decoding of protocol data units can be performed without knowing the data type of the user-specific data being processed at the start of the program's running time.

A first aspect of the present invention comprises a method of encoding protocol data units in an open system with a plurality of objects, wherein definitions of data types are entered into a definition dictionary, wherein data of one of the objects is input, said data being of a given type, wherein the given type of said input data is determined, wherein generic functions are used, wherein one such generic function is applied to an abstract data type, generating an entity of the abstract data type which is a concrete representation of the object in an internal structure, wherein the abstract data type to which one of the generic functions is applied is assigned the definition of the given data type from the definition dictionary, wherein first values of the entity of the abstract data type are generated from the input data using one of the generic functions, wherein a generic encoding function is applied to said first values and the first values are encoded into second values in a transmission language, and wherein said second values are combined into one protocol data unit.

In further accord with this first aspect of the present invention, a third value which corresponds to a representation of the input data of the object and of the given type of said input data is input in an abstract description language, and the first values of the entity of the abstract data type are generated by means of the third value in the abstract description language.

A second aspect of the present invention comprises a method of decoding protocol data units in an open system with a plurality of objects wherein definitions of data types are entered into a definition dictionary, wherein protocol data units with second values which are assigned to one of the objects and are of a given data type are input in a transmission language, wherein the given data type of the second values is determined, wherein generic functions are used, wherein one such generic function is applied to an abstract data type, generating an entity of the abstract data type which is a concrete representation of the object in an internal structure, wherein the abstract data type to which one of the generic functions is applied is assigned to the definition of the given data type from the definition dictionary, and wherein a generic decoding function is applied to the second values and the second values are decoded into first values of the entity of the abstract data type.

In further accord with the first and second aspects of the present invention, the definitions of further data types are entered into the definition dictionary if the given data type was not previously contained in the definition dictionary and could not be assigned to the abstract data type to which one of the generic functions is applied, and wherein the given data type is now assigned to the abstract data type.

In still further accord with the first and second aspects of the present invention, the open system comprises a plurality of system elements, wherein between at least two of the system elements, communication is performed via a protocol, and wherein information transmitted during the communication is transmitted in the form of protocol data units. The open system may be a telecommunications network, and the system elements may be exchanges.

Thus, the problem of the prior art, where the data type used must be known prior to the program start, is overcome. As mentioned above, in the prior art, the functions of the program are generic functions which can be applied to different data types, but if the data type changes, the program must be recompiled for this data type.

Recalling the task of the present invention, for an open system with system elements, where communication takes place between the system elements for controlling applications, and to this end, user-specific data must be encoded and decoded in the system elements and the type of user-specific data to be processed does not become known until the run time of the program needed for encoding and decoding, according to the teachings of the present invention, a definition dictionary contains the definitions of different data types in an abstract description language (e.g., ASN.1 and GDMO) and the generic functions are applied to abstract data types. During the run time of the program, the user-specific data is input and its type is determined. The definition of this data type is taken from the definition dictionary and assigned to the abstract data types, so that the functions of the program are performed with the user-specific data.

Advantageously, according to the present invention, no recompiling of the program is necessary if the data type changes. Moreover, further functions which have not yet been implemented can be made available later. The present invention enables faster-than-conventional implementations (e.g., ten times faster than XMP/XOM encoder/decoder).

One solution of the present invention is applicable to an open system comprising a telecommunications network with exchanges. With the method of the present invention, data of arbitrary objects, such as exchanges, subscribers listed in exchanges, or subscriber numbers, is manipulated, i.e., for example, erased, changed or generated.

These and other objects, features and advantages of the present invention will become more apparent in light of the detailed description of a best mode embodiment thereof, as illustrated in the accompanying drawing.

BRIEF DESCRIPTION OF THE DRAWING

FIGS. 3A & 3B are an implementation example of the configuration example of the method according to the invention.

BEST MODE FOR CARRYING OUT THE INVENTION

Figure 1:
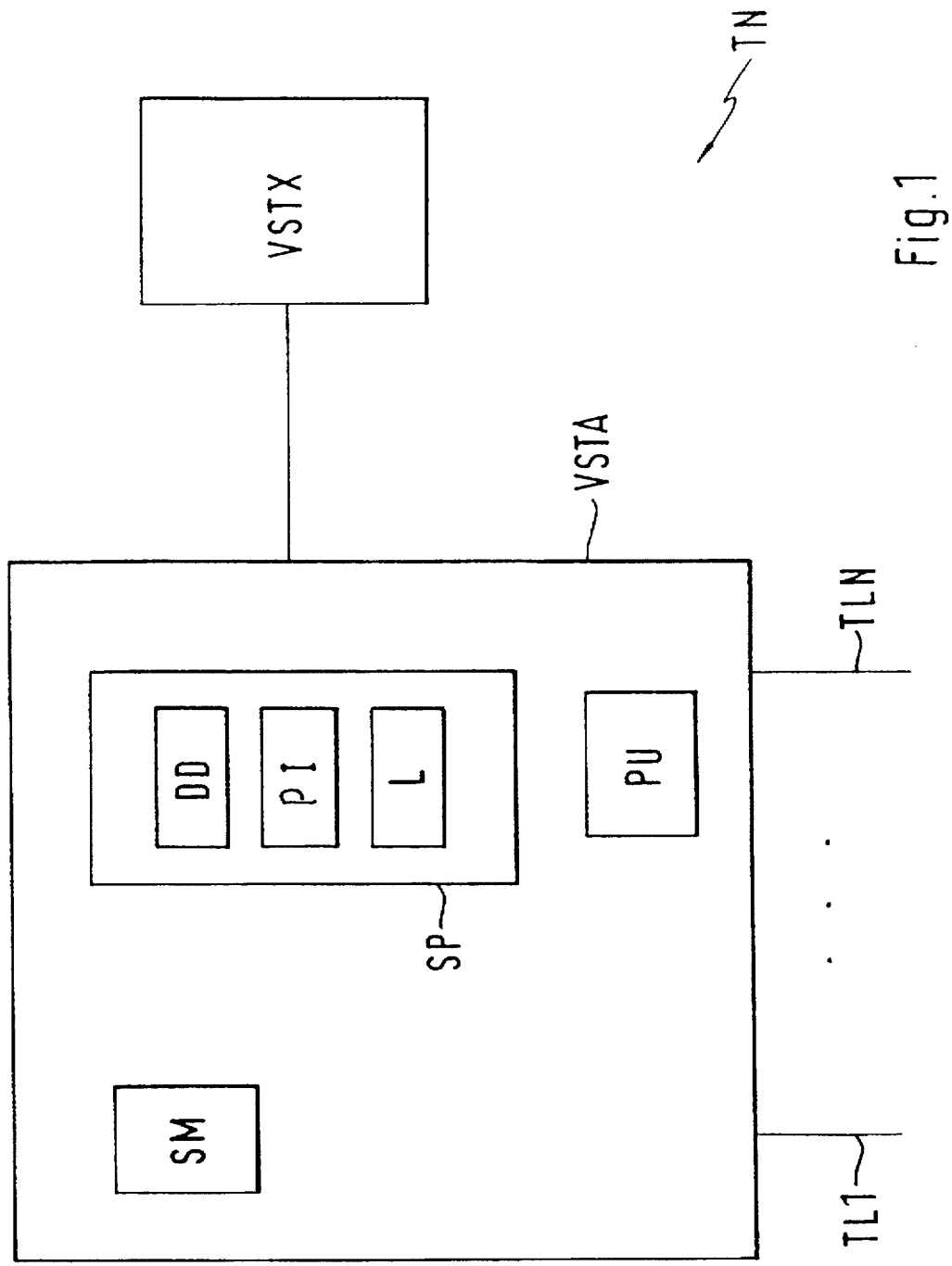
FIG. 1 is an application example of a telecommunications network as an open system.

FIG. 1 illustrates an application example of an open system with system elements. In the present instance the open system is a telecommunications network and the system elements are exchanges. However, the invention is not limited in any way to a telecommunications network. It is also possible for example to use the invention in a computer network which e.g. has access to data bases. The invention can generally be applied to every open system wherein data of a given type must be converted into the data of a transmission language (e.g. BER), and vice versa, without necessarily knowing the type of the data to be converted at the start of the running time of the program performing the conversion. The data to be converted by the program refer to any objects of the open system. Such an object is any partial unit of the open system. Said objects must have defined properties which are described by the data and which can be manipulated. In this connection for example, manipulated means that the data can be erased, changed or generated.

A telecommunications network TN of the present application example contains a number of exchanges, of which only a first exchange VSTA and a second exchange VSTX are further described in the following. The two exchanges VSTA and VSTX are interconnected by service lines. Communication for controlling applications in the telecommunications network takes place between the two exchanges VSTA and VSTX, and is carried out by means of communication protocols. The data with the information of this communication are transmitted in a given transmission language by means of a predetermined transmission function. In the present application example, this transmission language is BER (Basic Encoding Rules) known from the CCITT recommendation X.209. However, it is also possible to use a different transmission language, such as for example PER (Packet Encoding Rules). The data are combined into protocol data units (PDUs) for transmission between the exchanges VSTA and VSTX.

Representing the exchanges of the telecommunications network TN, the construction of exchange VSTA is described in the following, which is necessary to clarify the invention. The exchange VSTA contains a control means SM to control the sequences required by the invention. To that end the control means SM access data which are stored in a memory SP and in a buffer PU. A number of subscriber stations, not illustrated in FIG. 1, are connected to the exchange VSTA via subscriber lines TL1, . . . , TLn. An object of the telecommunications network TN can be any partial unit of the telecommunications network TN, for example one of the subscriber stations, its subscriber number, one of the subscriber connections in the exchange VSTA, or the exchange itself. The program for converting the data, which is written in an implementation language, is stored in a first area PI of the memory SP. The program is implemented in a way so that generic functions are applied to abstract data types. Generic functions can be used for different data types of a given implementation language. An abstract data type is a type whose internal structure is not known or is intentionally hidden. An abstract data type is rendered useable by assigning it a concrete definition of a data type by means of an access function. Abstract data types are described in greater detail in the essay "Abstraction techniques in modern programming languages" by Mary Shaw, IEEE Software, October 1984, pages 10 to 26. The generic functions that can be used in the program are stored in a second area L of memory SP, so that they can be accessed when the program is executed. The definitions of a number of data types are stored in a third area DD of memory SP. In the present application example said definitions are written in an abstract description language, e.g. in the GDMO (Guidelines for the Definition of Managed Objects) known from the CCITT recommendation X.724, or in the ASN.1 (Abstract Syntax Notation) known from the CCITT recommendation X.208. However, it is also possible to use other description languages to describe the data type definitions.

Figure 2:
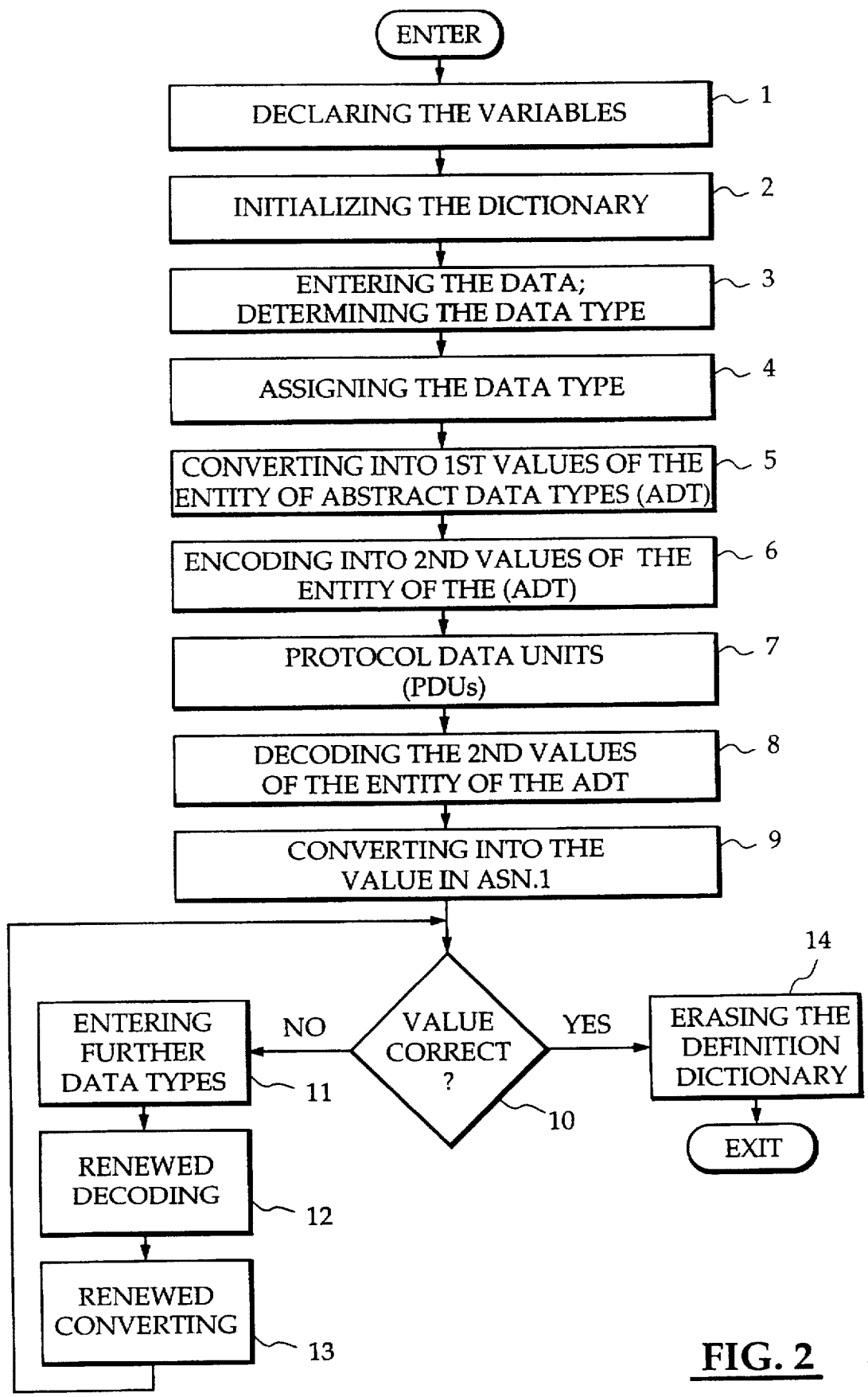
FIG. 2 is a flow diagram of a configuration example of the method according to the invention.

FIG. 2 describes a flow diagram of a configuration example of the method of the invention for encoding or decoding protocol data units. In a first step 1, a declaration of variables needed to implement the method is carried out. This is followed by the initialization of a definition dictionary in step 2. Definitions of data types from the third area DD of memory SP are assigned to the definition dictionary. The access function of one of the abstract data types accesses this definition dictionary when a data type is assigned to the abstract data type. Subsequently the user-specific data of the object, which must be encoded for transmission in the telecommunications network TN, are entered in step 3. These data have an established data definition and correspond to a concrete data type. The data of the object are indicated in a data file by a third value written in the abstract description language. This third value is evaluated and the type of the object data are determined. In a step 4, the definition of the given type of the object data is assigned to the abstract data types in the implementation language used. In a subsequent step 5, the data of the object are converted into first values of an entity of the abstract data type with an internal data structure. In that case the entity of the abstract data type is a concrete representation of the object in the internal data structure and is represented in the program by one of the variables. In a step 6 a generic encoding function is then applied to the first values, whereby the first values are encoded into second values in the transmission language. In a step 7 these second values are then combined into protocol data units for transmission in the telecommunications network TN. To that end the second values are temporarily stored in the buffer PU of exchange VSTA before the transmission.

It is possible to first perform a check of the protocol data units before these protocol data units are transmitted. To that end in a step 8 a generic decoding function is applied to the second values in the transmission language. This decodes the second values into fourth values of the entity of the abstract data type. These fourth values of the entity of the abstract data type are converted in a step 9 into a fifth value written in the abstract description language. A check is performed in a step 10 as to whether the fifth value corresponds to the third value in the abstract description language. If this is not the case, definitions of further data types are entered into the definition dictionary in a step 11. Then in a step 12 a new decoding takes place of the second values into fourth values of the entity of the abstract data type, and in a step 13 a new conversion of the fourth values into the fifth value in the abstract description language takes place. Subsequently the method branches off to step 10 again, which again checks whether this fifth value corresponds to the third value in the abstract description language. If this is the case, after step 10 the method branches off to a step 14, wherein the definition dictionary is erased and the method is then terminated.

FIG. 3 describes an implementation example of the above described configuration example of the method of the invention in the programming language C. This implementation example is stored as a program in the first area PI of memory SP. The applied functions are generic functions, which are stored in a library in the second memory area L, which is accessed to execute the program. In line 1, the declaration of a variable obj is performed by means of the function DTD_pObject. This variable obj is an entity of the abstract data type. In line 2 the declaration of a variable ber is performed by means of the function DTD_pObject. This variable ber is also an entity of the abstract data type. In line 3, the declaration of a variable dtd is performed by means of the function DTD_pDefinitions. By means of the generic function DTD_deserialize, this variable dtd is assigned a definition dictionary which is filled with definitions of data types from the third area DD of memory SP. The data file in which the definitions of these data types are stored is indicated by the numbers 0, 0 in parentheses. In line 4, the declaration of a variable ws takes place by means of the function DTD_pWs. This variable is assigned a new memory area by means of the function DTD_new_workspace, which can be used to generate values of the entities of abstract data types. This memory reservation eases the handling of errors and increases the memory allocation speed. Subsequently in line 5, the first values of the entity obj of the abstract data type are generated by means of the function DTD_parse. To that end the data of the object, which are stored in an attributeList, are entered. This attributeList, which is entered in line 5, is shown in line 50 to 67. In that case the data are reproduced in the attributeList by a third value written in the abstract description language, which in the present example is the description language ASN.1. In the present implementation example, this third value is the combination of numbers written in braces in the attributeId, which represents a search criterion to determine the concrete data type of the data in the definition dictionary, and the attributevalue, which is an image of the data in the abstract description language ASN.1. The third value, which is written in the ASN.1, is evaluated, thereby determining the concrete data type of the data of the object. The information in the attributeList is obtained from the CCITT recommendation X.734 for the "Event report management function". The definition of the data type written in the abstract description language ASN.1 is subsequently transformed into the implementation language, and the data type is assigned to the abstract data type for which the functions of the implementation example are applied. The first values of the entity obj of the abstract data type generated in line 5 are subsequently encoded in line 6 into second values of the entity ber of the abstract data type by using a function DTD_encode. These second values of the entity ber generated in line 6 can then be combined into protocol data units and transmitted via the telecommunications network TN. To check the encoded second values generated in line 6, the decoding of the second values takes place in line 7 by applying the decoding function DTD_decode. This creates the fourth values of an entity of the abstract data type. These fourth values are then converted into the fifth value in the abstract description language ASN.1 by applying the function DTD_dump. The output of line 7 can be used to check whether this output corresponds to the values entered in line 5. The attributeList, which is read out in line 7, is shown in line 70 to 83. It can be seen in the present implementation example that the values of attributeID (2 9 3 2 7 999) do not correspond to the values entered in line 5 for these attributeID values. Therefore an error occurred during the encoding, because the necessary data type was not in the definition dictionary accessed by the abstract data type. In line 8 therefore, further definitions of data types stored in the data file "my_def.per" are assigned to the dictionary by means of the function DTD_deserialize. Subsequently a new decoding of the second value of entity ber of the abstract data type is performed in line 9 by means of the function DTD_decode. The function DTD_dump is again applied to the thus generated fourth values of the entity of the abstract data type, to convert the fourth values into the fifth value in the abstract description language ASN.1. From the output of this line 9 can be seen that the now obtained fifth value for the attributeID {2 9 3 2 7 999} corresponds to the third value entered in line 5. The attributeList, which is read out in line 9, is shown in line 90 to 107. Subsequently in line 10 the memory area reserved in memory SP in line 4 is released. The entities of the abstract data type within this memory area are erased. In line 11 all inputs are erased from the definition dictionary.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of encoding protocol data units in an open system (TN) with a plurality of objects wherein definitions of data types are entered into a definition dictionary, wherein data of one of the objects is input, said data being of a given type, wherein the given type of said input data is determined, wherein generic functions are used, wherein one such generic function is applied to an abstract data type, generating an entity of the abstract data type which is a concrete representation of the object in an internal structure, wherein the abstract data type to which one of the generic functions is applied is assigned the definition of the given data type from the definition dictionary, wherein first values of the entity of the abstract data type are generated from the input data using one of the generic functions, wherein a generic encoding function is applied to said first values and the first values are encoded into second values in a transmission language, and wherein said second values are combined into one protocol data unit.

2. A method as claimed in claim 1, characterized in that a third value which corresponds to a representation of the input data of the object and of the given type of said input data is input in an abstract description language, and that the first values of the entity of the abstract data type are generated by means of the third value in the abstract description language.

3. A method as claimed in claim 1, characterized in that the definitions of further data types are entered into the definition dictionary if the given data type was not previously contained in the definition dictionary and could not be assigned to the abstract data type to which one of the generic functions is applied, and that the given data type is now assigned to the abstract data type.

4. A method as claimed in claim 1, characterized in that the open system comprises a plurality of system elements, that between at least two of said system elements, communication is performed via a protocol, and that information transmitted during said communication is transmitted in the form of protocol data units.

5. A method as claimed in claim 4, characterized in that the open system is a telecommunications network, and that the system elements are exchanges.

6. A method of decoding protocol data units in an open system (TN) with a plurality of objects wherein definitions of data types are entered into a definition dictionary, wherein protocol data units with second values which are assigned to one of the objects and are of a given data type are input in a transmission language, wherein the given data type of the second values is determined, wherein generic functions are used, wherein one such generic function is applied to an abstract data type, generating an entity of the abstract data type which is a concrete representation of the object in an internal structure, wherein the abstract data type to which one of the generic functions is applied is assigned to the definition of the given data type from the definition dictionary, and wherein a generic decoding function is applied to the second values and the second values are decoded into first values of the entity of the abstract data type.

7. A method as claimed in claim 6, characterized in that the definitions of further data types are entered into the definition dictionary if the given data type was not previously contained in the definition dictionary and could not be assigned to the abstract data type to which one of the generic functions is applied, and that the given data type is now assigned to the abstract data type.

8. A method as claimed in claim 6, characterized in that the open system comprises a plurality of system elements, that between at least two of said system elements, communication is performed via a protocol, and that information transmitted during said communication is transmitted in the form of protocol data units.

9. A method as claimed in claim 8, characterized in that the open system is a telecommunications network, and that the system elements are exchanges.

* * * * *